(No Model.)

E. E. L. WOODWARD.
SAFETY CAR.

No. 383,845. Patented May 29, 1888.

Witnesses:

Inventor:
E. E. L. Woodward
Attorney.

UNITED STATES PATENT OFFICE.

ELLEN E. L. WOODWARD, OF CHICAGO, ASSIGNOR OF ONE-HALF TO FREDERICK S. WOODWARD, OF TURNER, ILLINOIS.

SAFETY-CAR.

SPECIFICATION forming part of Letters Patent No. 383,845, dated May 29, 1888.

Application filed March 5, 1888. Serial No. 266,231. (No model.)

*To all whom it may concern:*

Be it known that I, ELLEN E. L. WOODWARD, a citizen of the United States of America, residing at Chicago, in the county of Cook and State of Illinois, have invented certain new and useful Improvements in Safety-Cars, of which the following is a specification, reference being had therein to the accompanying drawings.

My invention relates to improvements in railroad-cars.

The object of my invention is to provide a car-roof which is separate from the main body of the car, said roof being held in position by hooks or other suitable fastening devices, which will be automatically detached in case the car is turned on its side, thus allowing the roof to become detached from the main body of the car and afford means of egress for the passengers.

Figure 1:
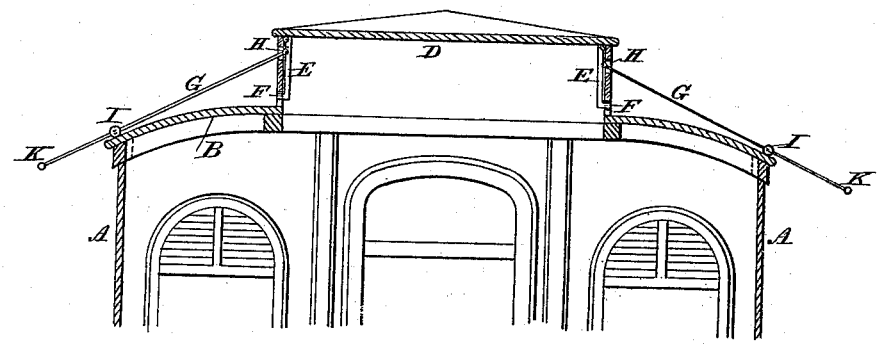
Figure 2:
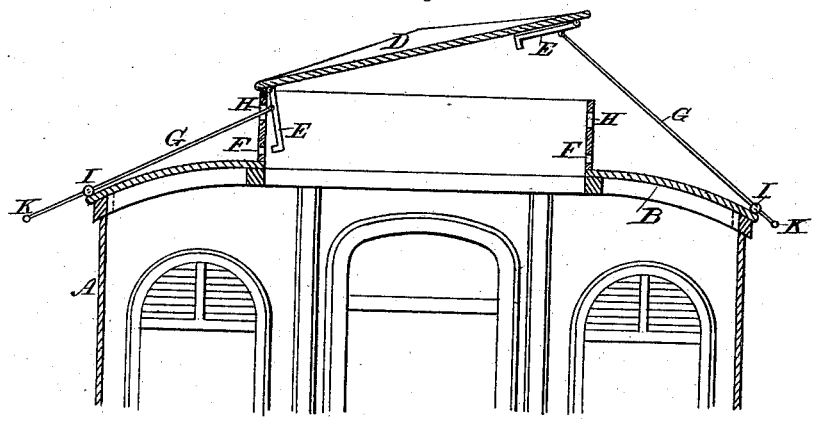
Figure 3:
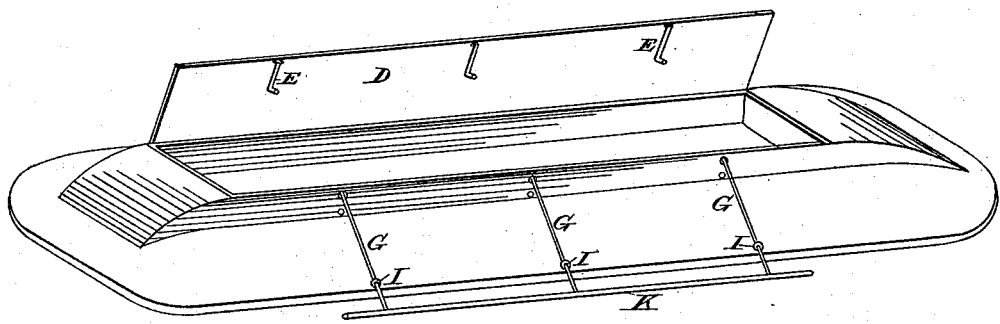

Referring to the drawings, Figure 1 is a transverse sectional view of the upper portion of a railway-car, showing the removable roof secured in position. Fig. 2 is also a transverse sectional view of the upper portion of a railway-car, showing the removable roof detached. Fig. 3 is a perspective view of the top of the car, showing the detachable portion of the roof partly raised.

A indicates the main body of an ordinary passenger car or coach, having the roof portion B and raised or ventilating portion C, which is located in the center of the roof and extends almost the entire length of the car, as is now customary in this class of coaches.

D is the removable roof, which is designed to cover the ventilating portion C of the car, said roof D being provided on its under side with a series of hooks, E, adapted to engage holes or openings F, formed in the sides of the ventilating portion C.

G are rods which pass through openings H in the sides of the portion C, the inner ends of which are secured to or adapted to impinge against the sides of the hooks E. The outer ends of the rods G pass through eyes or loops I, secured to the outer edge of the roof portion B, and project slightly beyond the side of the car, as shown, where they are secured to the horizontal bar K.

Instead of making the roof D in one piece, I may divide it up into several pieces or sections, the sections alternating with portions of the roof which are rigidly connected to the car-body.

In case of accident, when the car is overturned, the bars or rods K strike the ground, which forces the bars G inward, disconnecting the hooks E and allowing the roof portion D to fall away from the main body of the car, and thus affording means by which the passengers can escape from the wreck.

Having thus described my invention, what I claim, and desire to secure by Letters Patent, is—

1. A safety-car for railways, consisting of a detachable roof portion held in position by means of hooks, in combination with rods G, projecting outside the car, substantially as described, whereby the rods are caused to release the hooks when the car is overturned, as set forth.

2. In safety-cars of the character described, the detachable roof D, provided with the hooks E, for engaging holes F in the ventilating portion C, in combination with the rods G, projecting outside the car, and the rod or bar K, connected to the ends of the rods G, for releasing the hooks when the car is overturned, as set forth.

In testimony whereof I affix my signature in presence of two witnesses.

ELLEN E. L. WOODWARD.

Witnesses:
W. J. SCULLY,
J. S. CHIPMAN.